(12) United States Patent
Sato et al.

(10) Patent No.: US 8,356,455 B2
(45) Date of Patent: Jan. 22, 2013

(54) PACKAGING SYSTEM INCLUDING CONTROL MEANS WITH POWER-SAVING MODE

(75) Inventors: Ryoichi Sato, Ritto (JP); Shinji Koike, Ritto (JP)

(73) Assignee: Ishida Co., Ltd., Kyoto-Shi (JP)

( * ) Notice: Subject to any disclaimer, the term of this patent is extended or adjusted under 35 U.S.C. 154(b) by 306 days.

(21) Appl. No.: 12/733,505

(22) PCT Filed: Oct. 31, 2008

(86) PCT No.: PCT/JP2008/069876
§ 371 (c)(1),
(2), (4) Date: Mar. 4, 2010

(87) PCT Pub. No.: WO2009/060795
PCT Pub. Date: May 14, 2009

(65) Prior Publication Data
US 2010/0242416 A1 Sep. 30, 2010

(30) Foreign Application Priority Data
Nov. 8, 2007 (JP) .................................. 2007-290629

(51) Int. Cl.
*B65B 57/10* (2006.01)
*B65B 1/32* (2006.01)
*B65B 9/10* (2006.01)

(52) U.S. Cl. ...................... 53/58; 53/73; 53/502; 53/550

(58) Field of Classification Search ................. 53/57, 58, 53/494, 495, 502, 73, 550; B65B 57/10, B65B 1/32, 9/10
See application file for complete search history.

(56) References Cited

U.S. PATENT DOCUMENTS

| | | | | |
|---|---|---|---|---|
| 2,810,999 A | * | 10/1957 | Spriggs | 53/571 |
| 5,966,909 A | * | 10/1999 | Kammler et al. | 53/552 |
| 7,131,249 B2 | * | 11/2006 | Michelotti | 53/493 |
| 8,122,689 B2 | * | 2/2012 | Pape | 53/440 |

FOREIGN PATENT DOCUMENTS

| | | |
|---|---|---|
| JP | 2001-343278 | 12/2001 |
| JP | 2002-166904 | 6/2002 |
| JP | 2004-155465 | 6/2004 |
| JP | 2006-301914 | 11/2006 |
| JP | 2007-62805 | 3/2007 |
| JP | 2007-84082 | 4/2007 |

OTHER PUBLICATIONS

International Search Report dated Feb. 3, 2009 in PCT/JP2008/069876.
International Search Report for International Application No. PCT/JP2008/069876, mailed Feb. 3, 2009, 4 pages.

* cited by examiner

*Primary Examiner* — Stephen F Gerrity
(74) *Attorney, Agent, or Firm* — Staas & Halsey LLP

(57) ABSTRACT

A system for reducing power consumption of a packaging machine, including a processing device performing a predetermined process on supplied processing objects and discharging them, and a packaging machine packaging the objects discharged from the processing device. The packaging machine includes a centralized control unit controlling the operation of the packaging machine. The control unit operates the packaging machine in a power-saving mode when an insufficient supply of the processing objects is in or is likely to be in the processing device.

3 Claims, 6 Drawing Sheets

F I G . 1
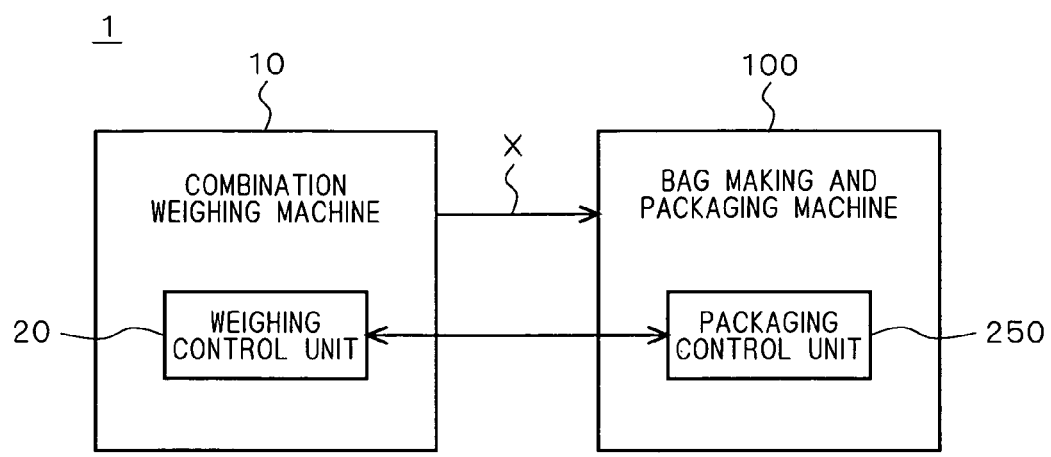
F I G . 2
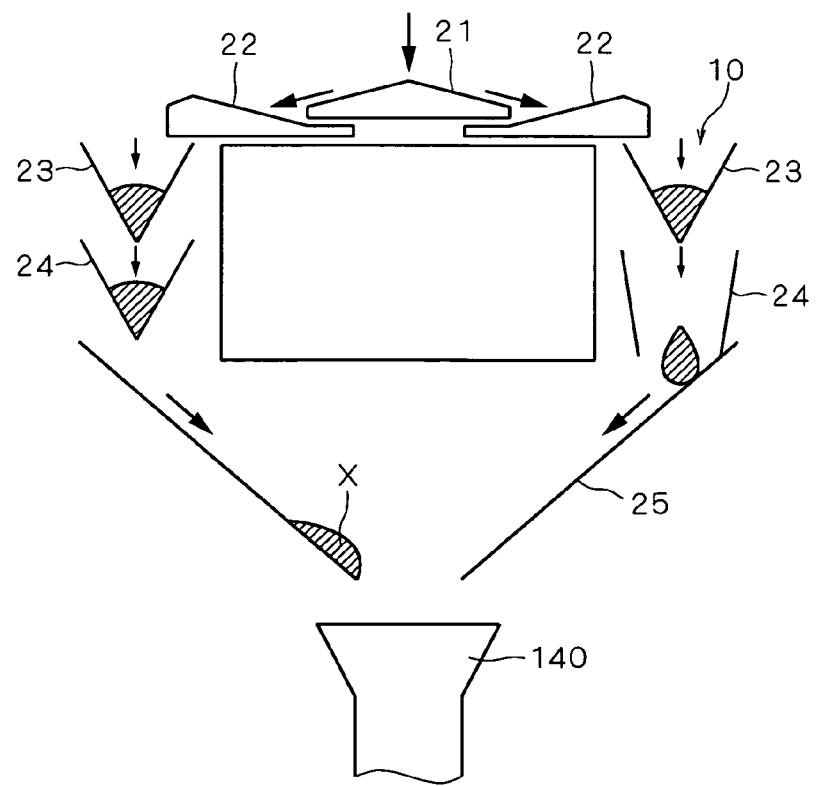

PACKAGING SYSTEM INCLUDING CONTROL MEANS WITH POWER-SAVING MODE

CROSS REFERENCE TO RELATED APPLICATIONS

The application claims the benefit under 35 U.S.C. Section 371, of PCT International Application No. PCT/JP2008/069876, filed Oct. 31, 2008, which claimed priority to Japanese Application No. 2007-290629, filed Nov. 8, 2007 in the Japanese Patent Office, the disclosures of which are incorporated herein by reference.

BACKGROUND OF THE INVENTION

1. Technical Field

The present invention relates to a packaging system including a packaging machine.

2. Background Art

As recited in Patent Documents 1 and 2, various technologies have been conventionally proposed for a weighing and packaging system including a weighing machine and a packaging machine. Patent Document 3 discloses the technology relating to the weighing machine.

Patent Document 1: Japanese Patent Application Laid-Open No. 2007-62805

Patent Document 2: Japanese Patent Application Laid-Open No. 2007-84082

Patent Document 3: Japanese Patent Application Laid-Open No. 2001-343278

Meanwhile, in the packaging system including a packaging machine such as a weighing and packaging system, since a processing object discharged from a processing device of a previous stage such as a weighing machine is packaged by a packaging machine, in terms of improving the availability factor of the whole of the system, it is extremely important to operate the processing device of the previous stage and the packaging machine in conjunction with each other. In this packaging system, the availability factor of the whole of the system is sometimes declined when a part of functions of the packaging machine is stopped for reducing power consumption of the packaging machine without considering the conjunction with the processing device of the previous stage such as the weighing machine.

SUMMARY OF INVENTION

The present invention has been made in view of the above, and the object thereof is to provide a technology capable of reducing power consumption of the packaging machine, suppressing the decline of the availability factor of the whole of the system in the packaging system including the packaging machine.

In order to solve the above problem, according to a first aspect of the present invention, a packaging system includes: a processing device performing a predetermined process on supplied processing objects and discharging the processing objects; and a packaging machine packaging the processing objects discharged from the processing device, wherein the packaging machine includes a control unit centralized controlling the operation of the whole of the packaging machine, and the control unit controls the packaging machine to operate in a power-saving mode when insufficient supply of the processing objects occurs or is likely to occur in the processing device.

According to a second aspect of the present invention, in the first aspect of the packaging system, the control unit recovers the packaging machine from the power-saving mode when insufficient supply of the processing objects is resolved or is likely to be resolved in the processing device.

According to a third aspect of the present invention, in either of the first and second aspects of the packaging system, wherein the packaging machine further includes: a sealing mechanism sealing packaging material; and a heater heating the sealing mechanism, and the control unit reduces power consumption of the heater in the power-saving mode.

According to the first to third aspects of the packaging system of the present invention, when insufficient supply of the processing objects occurs or is likely to occur in the processing device, the packaging machine operates in the power-saving mode, so that the power consumption of the packaging machine is reduced, suppressing the decline of the availability factor of the whole of the system.

Particularly, according to the second aspect, when insufficient supply of the processing objects is resolved or is likely to be resolved in the processing devices, the packaging machine is recovered from the power-saving mode, thereby surely preventing the packaging machine from remaining to operate in the power-saving mode after resolving the insufficient supply of the processing objects in the processing device. Accordingly, the decline of the availability factor of the whole of the system is further suppressed.

Particularly, according to the third aspect, when the insufficient supply of the processing objects occurs or is likely to occur in the processing device, power consumption of the heater consuming much more power is reduced in the packaging machine, allowing to greatly reduce the power consumption of the whole of the packaging machine.

These and other object, features, aspects and advantages of the present invention will become more apparent from the following detailed description of the present invention when taken in conjunction with the accompanying drawings.

BRIEF DESCRIPTION OF DRAWINGS

FIG. 1 is a block diagram showing a configuration of a packaging system according to a preferred embodiment of the present invention.

FIG. 2 is a view showing a configuration of a combination weighing machine according to the preferred embodiment of the present invention.

DESCRIPTION OF THE EMBODIMENTS

Figure 3:
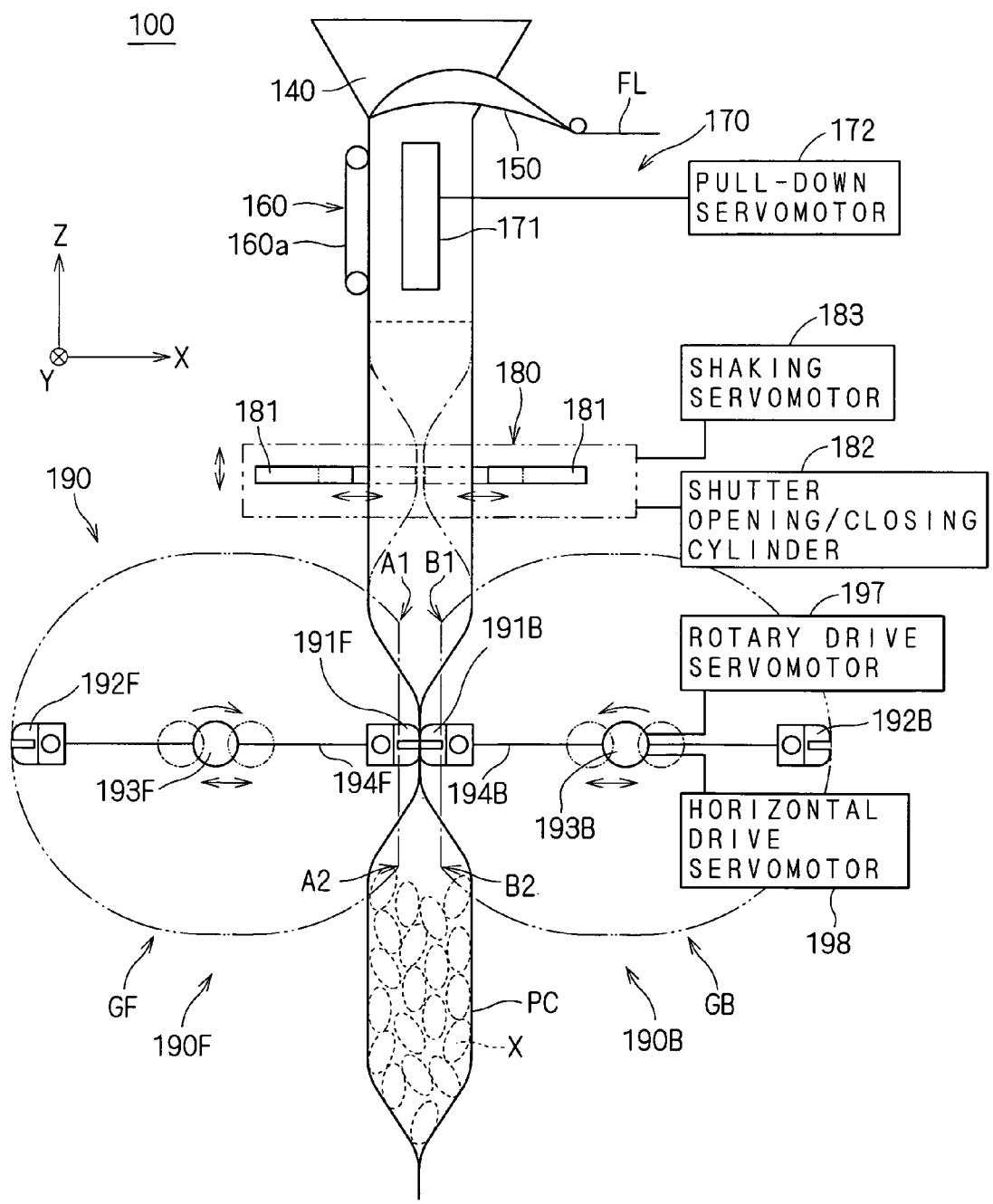
FIG. 3 is a side view showing a mechanical configuration of a bag making and packaging machine according to the preferred embodiment of the present invention.

Best Mode for Carrying Out the Invention

FIG. 1 is a block diagram showing a configuration of a packaging system 1 according to a preferred embodiment of the present invention. As shown in FIG. 1, the packaging system 1 according to the present preferred embodiment is, for example, a weighing and packaging system including a combination weighing machine 10 and a bag making and packaging machine 100. The combination weighing machine 10 weighs objects to be weighed X such as snacks and fruit having different weights individually, combines and discharges the objects to be weighed X such that a total weight thereof is within an allowable range. The bag making and packaging machine 100 makes bags, and with those bags, packages the objects to be weighed X having a predetermined weight and discharged from the combination weighing machine 10. The combination weighing machine 10 includes a weighing control unit 20 for centralized control of the operation of the whole of the combination weighing machine 10. Similarly, the bag making and packaging machine 100 includes a packaging control unit 250 for centralized control of the operation of the whole of the bag making and packaging machine 100. Each of the weighing control unit 20 and the packaging control unit 250 is composed of, for example, a CPU, a memory and the like, and the weighing control unit 20 and the packaging control unit 250 are capable of communicating to each other. The objects to be weighted X are objects to be packaged for the bag making and packaging machine 100 so that the objects to be weighed X may be referred to as "objects to be packaged X".

<Combination Weighing Machine>

FIG. 2 is a view showing a mechanical configuration of the combination weighing machine 10. As shown in FIG. 2, the combination weighing machine 10 includes a dispersing feeder 21, a plurality of radiating feeders 22, a plurality of pool hoppers 23, a plurality of weighing hoppers 24, and a collection chute 25. The objects to be weighed X are transferred with a conveyor and continuously supplied to the combination weighing machine 10.

First, the objects to be weighed X supplied to the combination weighing machine 10 are supplied in the vicinity of a central part of the dispersing feeder 21. As shown in FIG. 2, the plurality of radiating feeders 21 is disposed on the periphery of the dispersing feeder 21. The dispersing feeder 21 is vibrated by a shaking device not shown to disperse and transfer the supplied objects to be weighed X toward the plurality of radiating feeders 22.

The pool hopper 23 is disposed below each end of the plurality of radiating feeders 22. Each radiating feeder 22 is vibrated by the shaking device not shown and transfers the object to be weighed X transferred from the dispersing feeder 21 to the corresponding pool hopper 23.

Each of the plurality of pool hoppers 23 temporarily holds the object to be weighed X supplied from the corresponding radiating feeder 22. The weighing hopper 24 is disposed immediately below each of the plurality of pool hoppers 23, and each pool hopper 23 discharges the object to be weighed X held in the corresponding weighing hopper 24 by control of the weighing control unit 20.

Each weighing hopper 24 holds the object to be weighed X supplied from the corresponding pool hopper 23. Weighing equipment (not shown) such as a load cell is provided to each weighing hopper 24, weighing the object to be weighed X held by the weighing hopper 24 to output the result of weighing to the weighing control unit 20. Also, each weighing hopper 24 discharges the object to be weighed X held by the weighing control unit 20 to the collection chute 25.

The weighing control unit 20 obtains a combination of weight whose total weight is within the allowable range, from the weight of the objects to be weighed X in the plurality of weighing hoppers 24, on the basis of weighing signals received from the plurality of weighing hoppers 24. Thereafter, a process obtaining the combination of weight to be within the allowable range in this manner is referred to as a "combination calculation".

The weighing control unit 20 selects each weighing hopper 24 holding the object to be weighed X with weight composing the combination obtained by the combination calculation from the weighing hoppers 24. Then, when the weighing control unit 20 receives an after-mentioned discharging request signal outputted from the packaging control unit 250 of the bag making and packaging machine 100, the weighing control unit 20 controls the selected weighing hopper 24 to discharge the object to be weighed X. Thereby, the objects to be weighed X with the weight to be within the allowable range are supplied to the collection chute 25. The collection chute 25 collects the supplied objects to be weighed X and supplies them into a tube 140 of the bag making and packaging machine 100 of a latter stage described later.

In order to fill the objects to be weighed X to the empty weighing hopper 24 in which the objects to be weighed X are discharged, the weighing control unit 20 discharges the objects to be weighed X to the pool hopper 23 corresponding to this weighing hopper 24.

The combination weighing machine 10 regularly and repeatedly performs the combination calculation. Then, the discharging request signal is outputted from the bag making and packaging machine 100 in accordance with the period of performing the combination calculation. Thus, the object to be weighed X having the weight to be within the allowable range is regularly discharged from the combination weighing machine 10. For instance, the object to be weighed X is discharged at the rate of several tens of times per minute.

<Bag Making and Packaging Machine>

Figure 4:
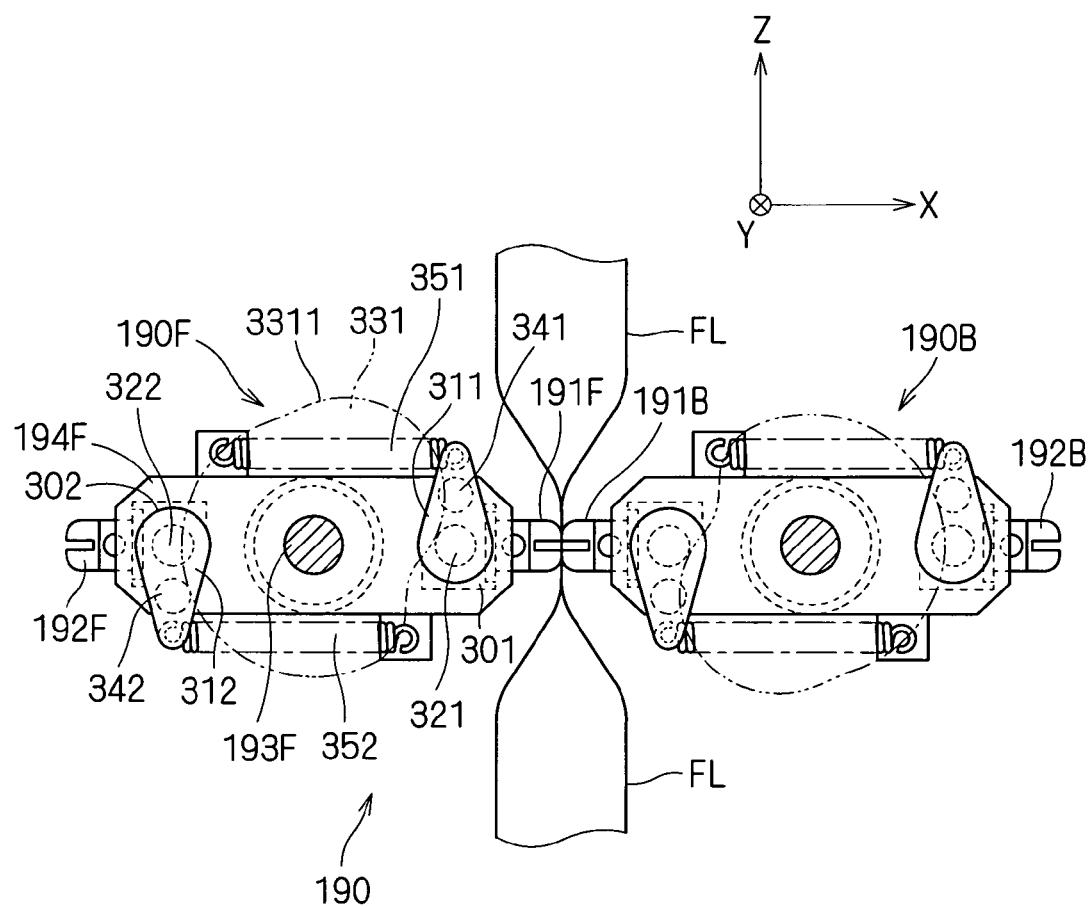
FIG. 4 is a side view showing a mechanical configuration of a lateral sealer according to the preferred embodiment of the present invention.
Figure 5:
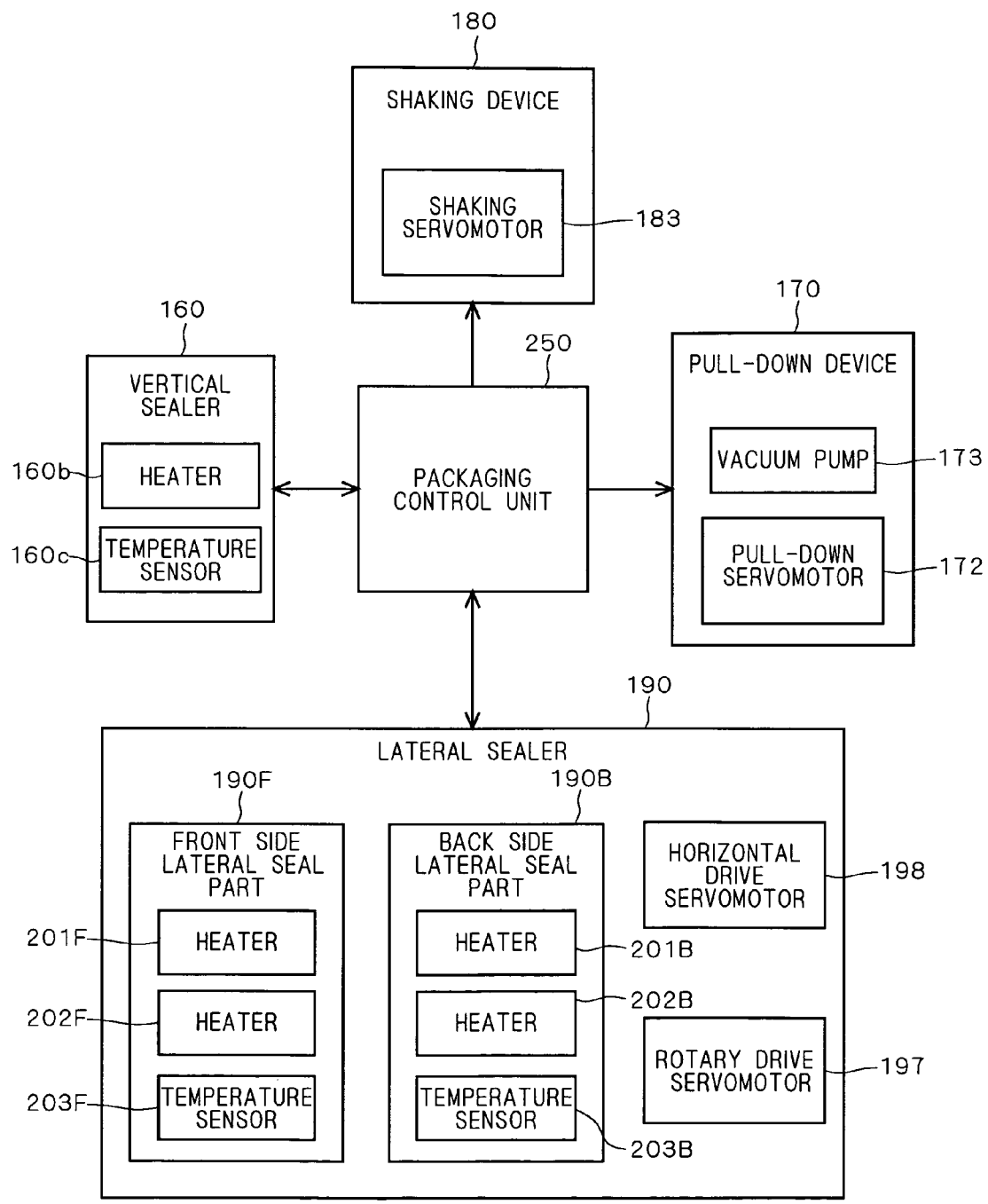
FIG. 5 is a block diagram showing a connection relation of a packaging control unit and other elements according to the preferred embodiment of the present invention.

FIG. 3 is a side view showing a mechanical configuration of the bag making and packaging machine 100. FIG. 4 is a side view showing a mechanical configuration of a lateral sealer 190 included in the bag making and packaging machine 100 in details. FIG. 5 is a block diagram showing a connection relation of the packaging control unit 250 and other elements. The bag making and packaging machine 100 is a vertical bag making and packaging machine which makes the bag PC and packages the object to be packaged X (the object to be weighed X) supplied from the combination weighing machine 10 using the bag PC. The description below employs a XYZ rectangular coordinate system with a front-back direction, left-right direction, and vertical direction of the bag making and packaging machine 100 as an X-axis direction, Y-axis direction, and Z-axis direction, respectively.

As shown in FIG. 3, the bag making and packaging machine 100 according to the present preferred embodiment is provided with the tube 140 catching the supplied objects to be packaged X and guiding them downward, and a former 150 shaping an elongated film FL to be packaging material into tube-shaped.

The tube 140 is funnel-shaped in its upper part, and cylindrical in its lower part. The funnel-shaped upper part of the tube 140 functions as a collection chute catching the supplied objects to be packaged X and guiding them into the tube 140. The tube 140 guides the objects to be packaged X inside as well as the tube-like film FL wrapped around the external surface to downward.

The former 150 includes a curved surface into which the tube 140 penetrates, and a space, through which the supplied film FL is passed, is provided between that curved surface and the tube 140. The former 150 attaches the supplied film FL closely to the curved surface, and then wraps the film FL formed into tube-shaped around the external surface of the tube 140 by passing through the space.

The bag making and packaging machine 100 is provided with a vertical sealer 160 sealing (depositing) an overlapping part extending to a vertical direction (longitudinal direction) of the tube-like film FL wrapped around the tube 140, and a pull-down device 170 transferring the tube-like film FL downward. The pull-down device 170 includes a pair of pull-down belts 171 (only one of them is shown in Figure) disposed at both sides of the tube 140, and a pull-down servomotor 172 driving the pull-down belts 171. The pair of pull-down belts 171 is driven by the pull-down servomotor 172 to transfer the film FL downward, suctioning the tube-like film FL from both sides with a vacuum pump 173 (see FIG. 5) provided for each pull-down device. The vacuum pump 173 and the pull-down servomotor 172 are controlled by the packaging control unit 250.

The vertical sealer 160 includes a belt member 160*a* sandwiching the film FL with the tube 140 as well as running to follow the transfer of the film FL. As shown in FIG. 5, the vertical sealer 160 further includes a heater 160*b* heating the belt member 160*a* so as to seal the overlapping part of the film FL, and a temperature sensor 160*c* measuring the temperature of the belt member 160*a*. The packaging control unit 250 controls the heater 160*b* on the basis of the measurement result of the temperature sensor 160*c*. Thereby, the heater 160*b* is driven so as to set the temperature of the belt member 160*a* to be constant. The temperature sensor 160*c* is composed of, e.g. a thermocouple and the like.

A shaking device 180 enhancing bulk density of the objects to be packaged X supplied to inside the tube-like film FL is disposed below the vertical sealer 160 and the pull-down device 170. A lateral sealer 190 sealing the upper end of the tube-like film FL containing the objects to be packaged X to make the bag PC as well as sandwiching the tube-like film FL from both sides of front and back to seal a predetermined position of the film FL, is disposed below the shaking device 180.

The shaking device 180 enhances the bulk density of the objects to be packaged X by shaking a pair of front and back shutter members 181 up and down in a state where the tube-like film FL including a bottom part formed with the lateral sealer 190 and supplied with the objects to be packaged X is sandwiched with those shutter members 181. The shaking device 180 is provided with a shutter opening/closing cylinder 182 opening and closing the pair of shutter members 181, and a shaking servomotor 183 shaking the pair of shutter members 181 up and down. The shaking servomotor 183 is controlled by the packaging control unit 250 (see FIG. 5). In FIG. 3, a state where the tube-like film FL is not sandwiched with the shutter members 181 is shown in a solid line, and a state where the tube-like film FL is sandwiched with the shutter members 181 is shown in a two-dot chain line.

The lateral sealer 190 includes a pair of front and back lateral seal parts 190F, 190B, and the tube-like film FL is sealed and cut in a lateral direction (cross direction) by operating the lateral seal parts 190F and 190B in cooperation with each other.

The lateral seal part 190F of the front side (hereinafter, referred to as a "front side lateral seal part 190F") includes seal jaws 191F, 192F, a rotation axis 193F reciprocating linearly back and forth as well as rotating clockwise, and a connecting member 194F connecting the seal jaws 191F, 192F, and the rotation axis 193F. A lateral seal part 190B of the back side (hereinafter, referred to as a "back side lateral seal part 190B") includes seal jaws 191B, 192B, a rotation axis 193B reciprocating linearly back and forth as well as rotating counterclockwise, and a connecting member 194B connecting the seal jaws 191B, 192B, and the rotation axis 193B.

Further, the lateral sealer 190 is provided with a rotary drive servomotor 197 rotating the rotation axis 193B counterclockwise as well as rotating the rotation axis 193F clockwise. The lateral sealer 190 is also provided with a horizontal drive servomotor 198 reciprocating the rotation axes 193B, 193F linearly in a horizontal direction (X-axis direction) perpendicular to a direction of transferring the film. FL (Z-axis direction). Each of the rotary drive servomotor 197 and the horizontal drive servomotor 198 is controlled by the packaging control unit 250 (see FIG. 5).

<Detailed Configuration of Lateral Sealer>

Next, a configuration of the lateral sealer 190 will be described in detail. In the present preferred embodiment, the front side lateral seal part 190F and the back side lateral seal part 190B have the identical configuration, so that the configuration of the front side lateral seal part 190F will be mainly described hereinafter.

As shown in FIG. 4, the front side lateral seal part 190F includes the connecting member 194F, the seal jaws 191F, 192F, base members 301, 302, pivot members 311, 312, and pivot axes 321, 322.

The connecting member 194F moves to follow the reciprocating linear motion of the rotation axis 193F, and also moves to follow the rotational motion of the rotation axis 193F.

Each of the seal jaws 191F, 192F at both sides of the connecting member 194F sandwiches the tube-like film FL in pairs with the seal jaws 191B, 192B, sealing (depositing) and cutting the sandwiched tube-like film FL. Heaters 201F, 202F are provided inside the seal jaws 191F, 192F, respectively, in order to deposit the tube-like film FL (see FIG. 5). The seal jaws 191F, 192F to be the sealing mechanism are heated with the heaters 201F, 202F, respectively. A temperature sensor 203F is built in either one of the seal jaws 191F, 192F and measures a temperature of the either one of them (see FIG. 5). The packaging control unit 250 controls each of the heaters 201F, 202F on the basis of the measurement result of the temperature sensor 203F (see FIG. 5). Thereby, each of the heaters 201F, 202F are driven so as to set the temperature of the seal jaws 191F, 192F to be constant.

As shown in FIG. 5, heaters 201B, 202B are provided inside the seal jaws 191B, 192B of the back side lateral seal part 190B, respectively, and a temperature sensor 203B is built in either one of the seal jaws 191B, 192B so as to measure a temperature of the either one of them. The packaging control unit 250 controls each of the heaters 201B, 202B on the basis of the measurement result of the temperature sensor 203B. Thereby, the heaters 201B, 202B are driven so as to set the temperatures of the seal jaws 191B, 192B to be constant. The temperature sensors 203B, 203F are composed of, e.g. a thermocouple and the like.

A cutter (not shown) driven by a solenoid and the like to cut a part of the film FL sealed in the lateral direction, is placed in each of the seal jaws 191F, 192F of the front side lateral seal part 190F, or in each of the seal jaws 191B, 192B of the back side lateral seal part 190B.

The base members 301, 302 hold the seal jaws 191F, 192F, respectively. The base members 301, 302 are coupled to the pivot axes 321, 322, respectively, and are capable of pivoting around the pivot axes 321, 322 relatively to the connecting member 194F.

The pivot members 311, 312 are coupled to the pivot axes 321, 322, in the vicinity of one end, respectively, and are capable of pivoting around the pivot axes 321, 322 relatively to the connecting member 194F.

The pivot axes 321, 322 are provided so as to penetrate the connecting member 194F laterally (Y-axis direction) in both ends of the connecting member 194F. The pivot axes 321, 322 are capable of pivoting relatively to the connecting member 194F.

Thereby, in the front side lateral seal part 190F, if the pivot members 311, 312 turn relatively to the connecting member 194F, the base members 301, 302 turn relatively to the connecting member 194F, and the angles of the seal jaws 191F, 192F to the connecting member 194F are to be changed.

The front side lateral seal part 190F further includes a cam 331, cam followers 341, 342, and springs 351, 352. While the cam 331 moves to follow the reciprocating linear motion of the rotation axis 193F, it is placed not to follow the rotational motion of the rotation axis 193F. Thus, even when the rotation axis 193F rotates, the cam 331 does not rotate. The cam followers 341, 342 are attached to the pivot members 311, 312, respectively, to be pivotable, and slidably in contact with a cam surface 3311 of the cam 331. The cam followers 341, 342 are attached at the position closer to the other end of the pivot members 311, 312 than the coupling position to the pivot axes 321, 322.

The springs 351, 352 are provided on a side part of the connecting member 194F. The spring 351 is disposed to extend from the other end of the pivot member 311 to the end of the connecting member 194F at the opposite side from the end, in which the pivot member 311 is provided, across the rotation axis 193F, and the cam follower 341 is biased toward the cam surface 3311 by the spring 351. Similarly, the spring 352 is provided to extend from the other end of the pivot member 312 to the end of the connecting member 194F at the opposite side from the end, in which the pivot member 312 is provided, across the rotation axis 193F, the cam follower 342 is biased toward the cam surface 3311 by the spring 352. Thereby, the shape of the cam surface 3311 defines the orientations of the seal jaws 191F, 192F to the connecting member 194F.

<Motion Trajectory of Seal Jaw>

Next, referring to FIG. 3, motion trajectory of the seal jaws 191F, 192F, and the seal jaws 191B, 192B will be described.

As shown in FIG. 3, each of the seal jaws 191F, 192F is driven by the rotary drive servomotor 197 and the horizontal drive servomotor 198 so as to repeatedly draw a trajectory GF closed in a substantially D-shape made of a straight section from a position A1 to a position A2 and a curving section including an arc from the position A2 to the position A1 in a side view. Each of the seal jaws 191B, 192B is driven by the rotary drive servomotor 197 and the horizontal drive servomotor 198 so as to repeatedly draw a trajectory GB closed in a substantially D-shape made of a straight section from a position B1 to a position B2 and a curving section including an arc from the position B2 to the position B1 in a side view.

The pair of the seal jaws 191B, 191F located to be symmetric back and forth to the tube-like film FL, moves to follow the tube-like film FL by being driven with the rotary drive servomotor 197 and the horizontal drive servomotor 198, cutting the tube-like film FL as well as sandwiching the tube-like film FL from both sides of back and forth so as to seal the tube-like film FL in a cross direction, when the seal jaw 191F is in the straight section of the trajectory GF and the seal jaw 191B is in the straight section of the trajectory GB. In contrast, the pair of the seal jaws 191B, 191F moves to be separated from the tube-like film FL when the seal jaw 191F is in the curving section of the trajectory GF and the seal jaw 191B is in the curving section of the trajectory GB. The pair of the seal jaws 192B, 192F moves similarly, cutting the tube-like film FL as well as sandwiching the tube-like film FL from the both sides of back and forth so as to seal in the cross section.

The shape of the cam surface 3311 of the cam 331 is determined such that the pair of the seal jaws 191B, 191F, or the pair of the seal jaws 192B, 192F appropriately sandwiches the tube-like film FL, opposing to each other, when moving linearly to the Z-axis direction.

<Packaging Operation of Bag Making and Packaging Machine>

Next, the packaging operation of the bag making and packaging machine 100 according to the present preferred embodiment will be described. First, the band-like film FL is wrapped around the tube 140 through the former 150 to be formed into tube-shaped, being transferred to downward by the pull-down device 170. Then, the overlapping part of the tube-like film FL is sealed with the vertical sealer 160. At this time, when the object to be packaged X of a predetermined weight is supplied into the tube-like film FL, in which a bottom part is formed, through the tube 140 from the combination weighing machine 10, an upside of the film FL where the object to be packaged X is supplied is sealed to form a new bottom part of the tube-like film FL as well as the bag PC in which the object to be packaged X is contained. Then, a substantially central part of the part of the film FL sealed in the cross section is cut and the bag PC is separated from the film FL by the lateral sealer 190. Thereafter, the same operation is repeated. Thereby, packed products are sequentially manufactured.

<Power-Saving Operation of Packaging System>

Next, the power-saving operation of the packaging system 1 according to the present preferred embodiment will be described. In the packaging system 1, when the insufficient supply of the objects to be weighed X occurs in the combination weighing machine 10, the combination weighing machine 10 notifies the bag making and packaging machine 100 of it, and the bag making and packaging machine 100 having received the notification starts to operate in a power-saving mode. In the combination weighing machine 10, when insufficient supply of the object to be weighed X is resolved, the combination weighing machine 10 notifies the bag making and packaging machine 100 of it, and the bag making and packaging machine 100 having received the notification recovers from the power-saving mode.

Figure 6:
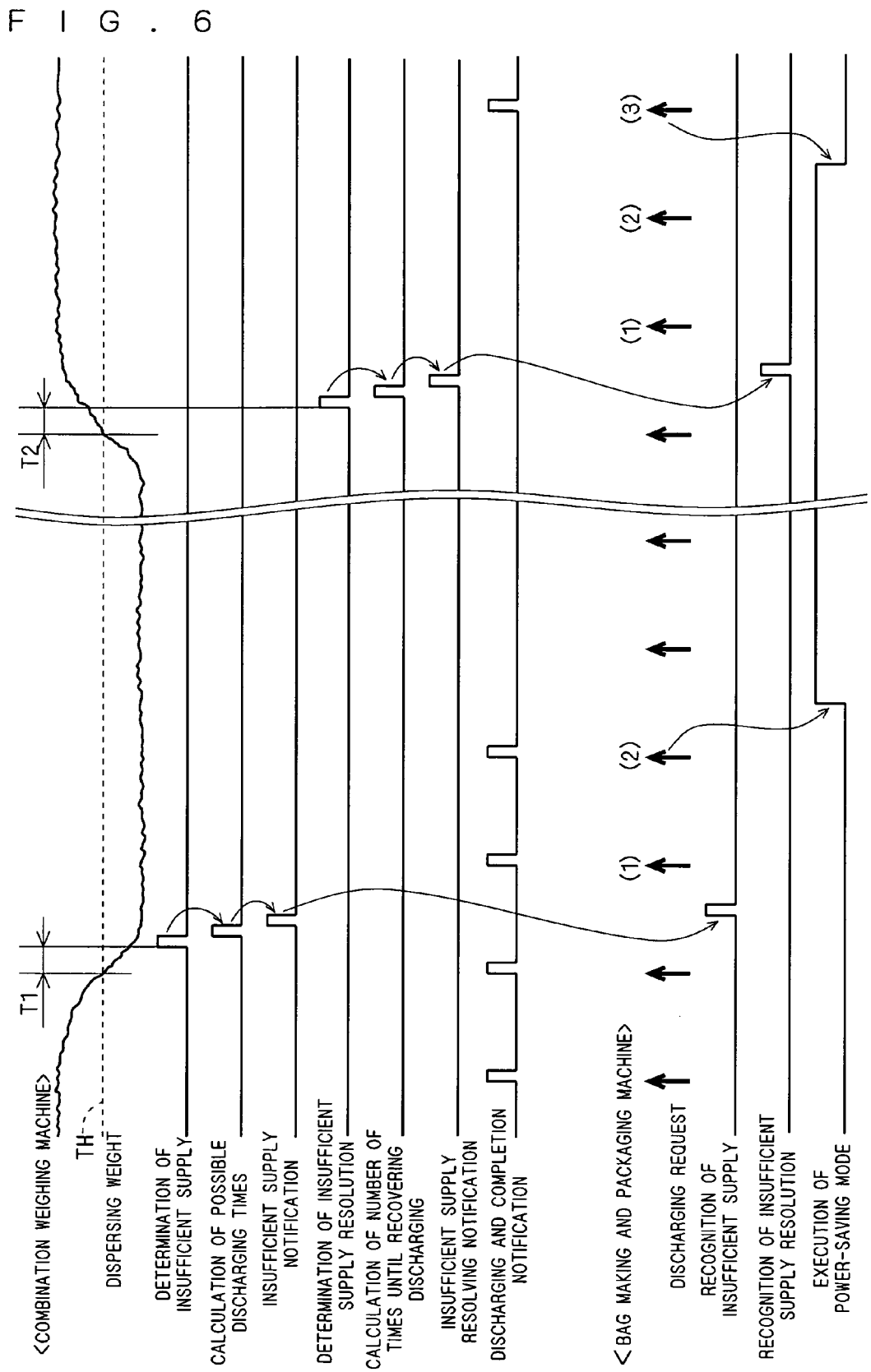
FIG. 6 is a view showing a power-saving operation of a packaging system according to the preferred embodiment of the present invention.

FIG. 6 is a view showing the power-saving operation of the packaging system 1. As shown in FIG. 6, the packaging control unit 250 of the bag making and packaging machine 100 regularly outputs the discharging request signal requesting to discharge the objects to be packaged X to the weighing control unit 20 of the combination weighing machine 10 in accordance with the period of performing the combination calculation. When the combination of weight of the objects to be packaged X to be within the allowable range is obtained by the combination calculation, the weighing control unit 20 having received the discharging request signal controls the weighing hopper 24 corresponding to the above combination to discharge the objects to be packaged X, and outputs a discharge completion notification signal notifying the completion of the discharge of the objects to be packaged X to the packaging control unit 250.

Here, in the combination weighing machine 10, if the insufficient supply of the objects to be packaged X occurs because the supply of the objects to be packaged X have been stopped from the conveyor of the previous stage and the like, and the supply amount of the objects to be packaged X have decreased, the objects to be packaged X supplied to each weighing hopper 24 gradually decreases so that the combination of weight of the objects to be packaged X to be within the allowable range is not obtained by the combination calculation. Since the weighing control unit 20 controls the weighing hopper 24 to discharge the objects to be packaged X only when the combination of weight to be within the allowable range by the combination calculation is obtained, when the supply of the objects to be packaged X to the combination weighing machine 10 is insufficient, the combination weighing machine 10 does not discharge the objects to be packaged X even if the bag making and packaging machine 100 outputs the discharging request signal.

The weighing control unit 20 observes the supply amount of the objects to be packaged X to the combination weighing machine 10, allowing to detect insufficient supply of the objects to be packaged X. That is, the weighing control unit 20 functions as a detection unit detecting insufficient supply of the objects to be packaged X. For instance, as shown in FIG. 6, when the weight of the objects to be packaged X supplied to the dispersing feeder 21 (hereinafter, referred to as "dispersing weight") is smaller than a predetermined threshold TH and this state continues for a predetermined time T1, the weighing control unit 20 determines that the insufficient supply of the objects to be packaged X occurs. Weighing equipment such as a load cell is mounted on the dispersing feeder 21 in the combination weighing machine 10, and this weighing equipment measures the dispersing weight. The weighing control unit 20 determines the insufficient supply of the object to be packaged X on the basis of the dispersing weight detected by the weighing equipment of the dispersing feeder 21.

When having detected the insufficient supply of the objects to be packaged X, the weighing control unit 20 calculates how many more times the objects to be packaged X is are to be discharged. If the insufficient supply of the objects to be packaged X occurs, the objects to be packaged X are still mounted on the dispersing feeder 21 and the radiating feeder 22, so that the objects to be packaged X supplied to the weighing hopper 24 do not decrease immediately. Thus, even after the insufficient supply of the objects to be packaged X occurs, the combination of weight to be within the allowable range is allowed to be obtained more times and the objects to be packaged X are discharged several more times from the combination weighing machine 10. The weighing control unit 20 calculates how many more times the objects to be packaged X are to be successively discharged from the weight of the objects to be packaged X currently held by each weighing hopper 24 and the current dispersing weight, in other words, by the combination calculation, calculates how many more times the combination of weight to be within the allowable range is to be successively obtained. Hereinafter, the number of times that the combination weighing machine 10 discharges the objects to be packaged X after the insufficient supply of the objects to be packaged X is detected, is referred to as "possible discharging times".

When calculating the possible discharging times, the weighing control unit 20 includes this in an insufficient supply notification signal notifying that the insufficient supply of the object to be packaged X occurs to output the insufficient supply notification signal to the packaging control unit 250.

The packaging control unit 250 of the bag making and packaging machine 100 receives the insufficient supply notification signal from the weighing control unit 20, thereby recognizing that the insufficient supply of the objects to be packaged X has occurred in the combination weighing machine 10. Then, the packaging control unit 250 operates the bag making and packaging machine 100 in the power-saving mode after outputting the discharging request signal with the same number of times as the possible discharging times included in the insufficient supply notification signal. FIG. 6 shows the operation example where the possible discharging times is two times. Thus, the bag making and packaging machine 100 enters into the power-saving mode after receiving the insufficient supply notification signal and then outputting the discharging request signal twice.

In the present preferred embodiment, the packaging control unit 250 operates the bag making and packaging machine 100 in the power-saving mode by reducing the power consumption of each of the heaters 160*b*, 201B, 201F, 202B, 202F of the vertical sealer 160 and the lateral sealer 190, the power consumption of each of the pull-down servomotor 172 and the vacuum pump 173 of the pull-down device 170, the power consumption of each of the rotary drive servomotor 197 and the horizontal drive servomotor 198 of the lateral sealer 190, and the power consumption of the shaking servomotor 183 of the shaking device 180. In the power-saving mode according to the present preferred embodiment, the energization of the heaters 160*b*, 201B, 201F, 202B, 202F is stopped, and the operations of the pull-down servomotor 172, the shaking servomotor 183, the rotary drive servomotor 197, the horizontal drive servomotor 198, and the vacuum pump 173 are constantly stopped.

As described above, when the insufficient supply of the objects to be packaged X occurs in the combination weighing machine 10, the combination weighing machine 10 is not allowed to obtain the combination of weight to be within the allowable range so that the objects to be packaged X are not discharged from the combination weighing machine 10. Thus, in this case, even if the power supplied to the heaters and the motors is stopped in the bag making and packaging machine 100 to lower power consumption, the availability efficiency in the entire packaging system 1 is not reduced.

Further, the weighing control unit 20 is capable of detecting that the insufficient supply of the objects to be packaged X is resolved. As shown in FIG. 6, for instance, when the dispersing weight detected in the weighing equipment of the dispersing feeder 21 is larger than the predetermined threshold value TH and this state continues for a predetermined time T2, it is determined that the insufficient supply of the objects to be packaged X is resolved.

The weighing control unit 20 detects that the insufficient supply of the objects to be packaged X is resolved, and calculates how many more times the combination calculation should be performed to obtain the combination of weight to be within the allowable range. That is, the number of times of performing the combination calculation until the combination of weight to be within the allowable range is obtained from detecting the resolution of the insufficient supply of the objects to be packaged X, is calculated. Since sufficient objects to be packaged X are not supplied to the weighing hopper 24 immediately even if the insufficient supply of the objects to be packaged X is resolved, the combination of weight to be within the allowable range is not obtained by the combination calculation and the objects to be packaged X are not discharged from the combination weighing machine 10 when a certain amount of time has not passed since the insufficient supply of the objects to be packaged X is resolved. The weighing control unit 20 calculates the number of times of performing the combination calculation until the combination of weight to be within the allowable range is obtained from detecting that the insufficient supply of the objects to be packaged X is resolved, on the basis of the weight of the objects to be packaged X currently held by each weighing hopper 24 and the current dispersing weight. Hereinafter, this number of times of performing the combination calculation is referred to as "the number of times until recovering discharging".

The weighing control unit 20 calculates the number of times until recovering discharging, and then includes this number in an insufficient supply resolving notification signal notifying that the insufficient supply of the objects to be packaged X is resolved, outputting this insufficient supply resolving notification signal to the packaging control unit 250.

The packaging control unit 250 recognizes that the insufficient supply of the objects to be packaged X is resolved in the combination weighing machine 10 by receiving the insufficient supply resolving notification signal from the weighing control unit 20. Then, the packaging control unit 250 recovers the bag making and packaging machine 100 from the power-saving mode before outputting the discharging request signal with the same number of times as the number of times until recovering discharging included in the insufficient supply resolving notification signal. That is, the packaging control unit 250 resumes the energization of the heaters 160b, 201B, 201F, 202B, 202F and resumes the operations of the pull-down servomotor 172, the shaking servomotor 183, the rotary drive servomotor 197, the horizontal drive servomotor 198, and the vacuum pump. Thereby, thereafter, the objects to be packaged X discharged from the combination weighing machine 10 are appropriately packaged. FIG. 6 shows the operation example where the number of times until recovering discharging is three times. Thus, the bag making and packaging machine 100 recovers from the power-saving mode before outputting the discharging request signal three times after receiving the insufficient supply resolving notification signal.

As described above, in the packaging system 1 according to the present preferred embodiment, the bag making and packaging machine 100 operates in the power-saving mode when the insufficient supply of the objects to be packaged X occurs, thereby suppressing the decline of the availability factor in the entire system and reducing the power consumption of the bag making and packaging machine 100.

In the packaging system 1 according to the present preferred embodiment, when the resolution of the insufficient supply of the objects to be weighed X in the combination weighing machine 10 is detected, and the resolution of the insufficient supply is detected, the bag making and packaging machine 100 is recovered from the power-saving mode. Thus, it is possible to surely avoid that the bag making and packaging machine 100 still operates in the power-saving mode even after resolving the insufficient supply of the objects to be weighed X in the combination weighing machine 10. Accordingly, the decline of the availability factor of the entire system is further suppressed.

In the packaging system 1 according to the present preferred embodiment, the combination weighing machine 10 is employed as a weighing machine, but instead of the combination weighing machine 10, a weighing machine weighing the supplied objects to be weighed and discharging them as they are, may be employed. Even in this case, when the insufficient supply of the objects to be weighed occurs in the weighing machine, the objects to be weighed are not discharged from the weighing machine and the interval that the weighing machine discharges the objects to be weighed is extremely longer, thus, a packaging machine is put into the power-saving mode when the insufficient supply of the objects to be weighed occurs in the weighing machine, thereby suppressing the decline of the availability factor of the entire system and reducing the power consumption of the packaging machine.

In the present preferred embodiment, while the power consumption of all of the heaters 160b, 201B, 201F, 202B, 202F included in the bag making and packaging machine 100, the vacuum pump 173, the pull-down servomotor 172, the shaking servomotor 183, the rotary drive servomotor 197, and the horizontal drive servomotor 198 is reduced when the bag making and packaging machine 100 is put into the power-saving mode, if the power consumption of at least one element is reduced, the power-saving of the bag making and packaging machine 100 is achieved. In the power-saving mode, the operation of the motor (not shown) transferring the film FL to the former 150 may be completely stopped.

In the bag making and packaging machine 100, since the power consumption of the heaters 160b, 201B, 201F, 202B, 202F is particularly great, it is extremely effective to reduce the power consumption of the heaters 160b, 201B, 201F, 202B, 202F, thereby greatly reducing the power consumption of the entire bag making and packaging machine 100.

When the power consumption of the heater included in the bag making and packaging machine 100 such as the heater 160b of the vertical sealer 160 is reduced, as described above, the energization of the heater may be stopped, or the current applied to the heater may simply be reduced. For instance, when the temperature of the heater at the time of packaging the objects to be packaged X is set to be 150° C., in the power-saving mode, the current applied to the heater is reduced to set the temperature of the heater at 50° C. In this case, when the bag making and packaging machine 100 recovers from the power-saving mode, the temperature of the heater increases to the temperature necessary for packaging immediately.

<Other Modifications>

In the above description, while the combination weighing machine 10 has detected the insufficient supply of the objects to be weighed X and the resolution of the insufficient supply in its own device and notified to the bag making and packaging machine 100, the bag making and packaging machine 100 may detect the insufficient supply of the objects to be weighed X and the resolution of the insufficient supply in the combination weighing machine 10. In this case, for instance, the weighing control unit 20 of the combination weighing machine 10 may regularly notify the packaging control unit 250 of the dispersing weight of its own device. The threshold value TH is stored in the packaging control unit 250, the packaging control unit 250 determines that the insufficient supply of the objects to be weighed X occurs in the combination weighing machine 10 when the notified dispersing weight is smaller than the threshold value TH and this state continues for the predetermined time T1, and stops outputting the discharging request signal and operates the bag making and packaging machine 100 in the power-saving mode. Thereafter, when the dispersing weight is larger than the predetermined threshold value TH and this state continues for the predetermined time T2, the packaging control unit 250 determines that the insufficient supply of the objects to be weighed X in the combination weighing machine 10 is resolved, and resumes outputting the discharging request signal and recovers the bag making and packaging machine 100 from the power-saving mode. Even in this case, the same effect is obtained.

In the above example, while the bag making and packaging machine 100 is operated in the power-saving mode when the insufficient supply of the objects to be weighed X occurs in the combination weighing machine 10, the bag making and packaging machine 100 may be operated in the power-saving mode at the stage where the insufficient supply of the objects to be weighed X is likely to occur in the combination weighing machine 10. For instance, the weighing control unit 20 determines that the insufficient supply of the objects to be weighed X is likely to occur when the decrease of the dispersing weight continues for a certain amount of time and the dispersing weight is likely to be smaller than the threshold value TH, and notifies the packaging control unit 250 thereof. The packaging control unit 250 recognizes that the insufficient supply of the objects to be weighed X is likely to occur in the combination weighing machine 10 by the notification from the weighing control unit 20, and then stops outputting the discharging request signal and operates the bag making and packaging machine 100 in the power-saving mode. Alternatively, the weighing control unit 20 regularly notifies the packaging control unit 250 of the dispersing weight, and the packaging control unit 250 determines that the insufficient supply of the objects to be weighed X is likely to occur in the combination weighing machine 10 when the notified dispersing weight starts decreasing and the decrease continues for a certain amount of time, and then stops outputting the discharging request signal and operates the bag making and packaging machine 100 in the power-saving mode. In any of the cases, the decline of the availability factor of the entire system is suppressed, allowing to reduce the power consumption of the bag making and packaging machine 100.

At the stage where the insufficient supply of the objects to be weighed X is likely to be resolved in the combination weighing machine 10, the bag making and packaging machine 100 may recover from the power-saving mode. For instance, the weighing control unit 20 determines that the insufficient supply of the objects to be weighed X is likely to be resolved when the dispersing weight smaller than the threshold value TH starts increasing and the increase continues for a certain amount of time so that the dispersing weight is likely to be larger than the threshold value TH, notifying the packaging control unit 250 thereof. The packaging control unit 250 recognizes that the insufficient supply of the objects to be weighed X is likely to be resolved in the combination weighing machine 10 by the notification from the weighing control unit 20, and then resumes outputting the discharging request signal and recovers the bag making and packaging machine 100 from the power-saving mode. Alternatively, the weighing control unit 20 regularly notifies the packaging control unit 250 of the dispersing weight, and the packaging control unit 250 determines that the insufficient supply of the objects to be weighed X is likely to be resolved in the combination weighing machine 10 when the notified dispersing weight starts increasing and the increase continues for a certain amount of time, and then resumes outputting the discharging request signal and recovers the bag making and packaging machine 100 from the power-saving mode. Any of the cases surely prevents the bag making and packaging machine 100 from still operating in the power-saving mode even after resolving the insufficient supply of the objects to be weighed X in the combination weighing machine 10.

Figure 7:
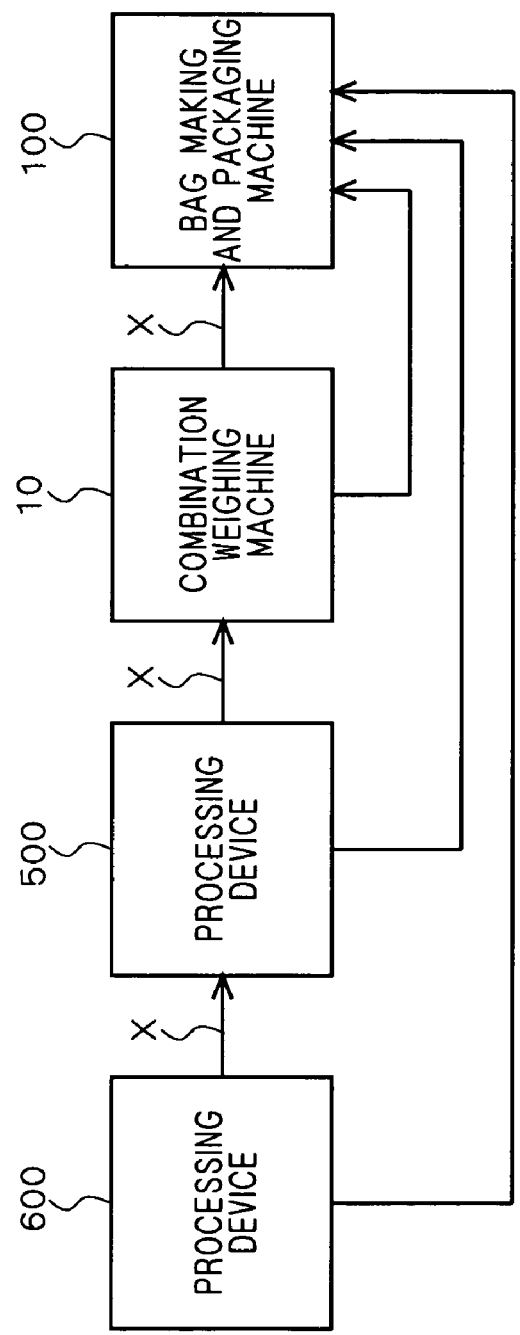
FIG. 7 is a block diagram showing a configuration of a modification of the packaging system according to the preferred embodiment of the present invention.

In the above example, while the bag making and packaging machine 100 is operated in the power-saving mode when the insufficient supply of the objects to be weighed X has occurred in the combination weighing machine 10 disposed at the previous stage of the bag making and packaging machine 100, the bag making and packaging machine 100 may be operated in the power-saving mode even when the insufficient supply of the processing objects has occurred in the processing devices other than the combination weighing machine 10. FIG. 7 is a block diagram illustrating a configuration of the packaging system 1 in this case.

In the example illustrated in FIG. 7, two processing devices 500, 600 performing predetermined processes on the processing objects X are disposed at the previous stages of the bag making and packaging machine 100 in addition to the combination weighing machine 10. For instance, the processing device 600 may be a seasoning device seasoning the supplied processing objects X such as snacks and discharging them, or an individual packaging machine individually packaging and discharging each of the supplied processing objects X. The processing device 500, for example, may be a conveyor transferring the processing objects X discharged from the processing device 600 to the dispersing feeder 21 of the combination weighing machine 10 as the objects to be weighed X.

Each of the processing devices 500, 600 detects the insufficient supply of the processing objects X in its own device, similarly to the combination weighing machine 10, and notifies the bag making and packaging machine 100 thereof. Each of the processing devices 500, 600 detects the resolution of the insufficient supply of the processing objects X in its own device, similarly to the combination weighing machine 10, and notifies the bag making and packaging machine 100 thereof.

In the processing device 500, a level sensor is attached to a transfer part transferring the processing objects X. This level sensor outputs a first detection signal when a thickness of a layer of the processing objects X on the transfer part is smaller than a predetermined level, and outputs a second detection signal when it is larger than the predetermined level. The processing device 500 determines that the insufficient supply of the processing objects 500 has occurred in its own device when the first detection signal is outputted from the level sensor, and notifies the bag making and packaging machine 100 thereof. The processing device 500 determines that the insufficient supply of the processing objects X has been resolved in its own device when the second detection signal is outputted from the level sensor, and notifies the bag making and packaging machine 100 thereof.

On the other hand, in regard to the processing device 600, a supplying device (not shown) supplying the processing device 600 with the processing objects X is provided in its previous stage, and this supplying device outputs the discharging notification signal every time the processing objects X of a predetermined amount are discharged. The processing device 600 determines that the insufficient supply of the processing objects X has occurred in its own device when the discharging notification signal outputted from the supplying device of the previous stage has been not inputted for a predetermined time since the previous input, and notifies the bag making and packaging machine 100 thereof. Thereafter, when the discharging notification signal outputted from the supplying device of the previous stage is inputted within the predetermined time from the previous input, the processing device 600 determines that the insufficient supply of the processing objects X in its own device has been resolved, and notifies the bag making and packaging machine 100 thereof.

The bag making and packaging machine 100 stops outputting the discharging request signal and operates the bag making and packaging machine 100 in the power-saving mode when the insufficient supply of the processing objects X in the device is notified from the processing device 500 or the processing device 600. As a result, the combination of weight of the objects to be packaged X to be within the allowable range is not obtained by the combination calculation of the combination weighing machine 10 when the insufficient supply of the processing objects X has occurred at least in either one of the processing device 500 and the processing device 600, so that the combination weighing machine 10 does not discharge the objects to be packaged X. Accordingly, even if the bag making and packaging machine 100 is put into the power-saving mode when the insufficient supply of the processing object X has occurred at least in either one of the processing device 500 and the processing device 600, the availability factor of the entire packaging system 1 is not declined.

The bag making and packaging machine 100 resumes outputting the discharging request signal and recovers the bag making and packaging machine 100 from the power-saving mode when the resolution of the insufficient supply of the processing objects X in the device is notified from the processing device 500 or the processing device 600. Thereby, the bag making and packaging machine 100 is surely prevented from still operating in the power-saving mode even after resolving the insufficient supply of the processing objects X in the processing devices 500, 600.

The bag making and packaging machine 100 may detect the insufficient supply of the processing objects X and the resolution of the insufficient supply in the processing devices 500, 600. In this case, for example, the processing device 500 is allowed to output the transferring amount of the processing objects X in its own device, and the bag making and packaging machine 100 may determine the insufficient supply of the processing objects X and the resolution of this insufficient supply in the processing device 500 on the basis of the transferring amount. The processing device 600 is allowed to output the discharging notification signal to the bag making and packaging machine 100 when discharging the processing objects X of a predetermined amount, and the bag making and packaging machine 100 determines that the insufficient supply of the processing objects X has occurred in the processing device 600 when the discharging notification signal has not been inputted for the predetermined time since the previous input, and thereafter, when the discharging notification signal becomes to be inputted within the predetermined time from the previous input, the bag making and packaging machine 100 determines that the insufficient supply of the processing objects X has been resolved in the processing device 600.

The bag making and packaging machine 100 may be operated in the power-saving mode at the stage where the insufficient supply of the processing objects X is likely to occur in the processing devices 500, 600. In this case, the processing device 500 may determine that the insufficient supply of the processing objects X is likely to occur in its own device on the basis of the transferring amount of the processing objects X in its own device, or the bag making and packaging machine 100 may determine that the insufficient supply of the processing objects X is likely to occur in the processing device 500 on the basis of the transferring amount notified from the processing device 500. Further, that the time interval of the discharging notification signal inputted to the processing device 600 from the supplying device of the previous stage is prolonged means that the supply amount of the processing objects X to the processing device 600 is decreased, so that the processing device 600 may determine that the insufficient supply of the processing objects X is likely to occur in its own device on the basis of the time interval of the discharging notification signal outputted from the supplying device of the previous stage. Still further, that the time interval of the discharging notification signal outputted from the processing device 600 is prolonged means that the supply amount of the processing objects X to the processing device 600 is decreased, so that the bag making and packaging machine 100 may determine that the insufficient supply of the processing objects X is likely to occur in the processing device 600 on the basis of the time interval of the discharging notification signal notified from the processing device 600.

The bag making and packaging machine 100 may be recovered from the power-saving mode at the stage where the insufficient supply of the processing objects X is likely to be resolved in the processing devices 500, 600. In this case, the processing device 500 may determine that the insufficient supply of the processing objects X is likely to be resolved in its own device on the basis of the transferring amount of the processing objects X in its own device, or the bag making and packaging machine 100 may determine that the insufficient supply of the processing objects X is likely to be resolved in the processing device 500 on the basis of the transferring amount notified from the processing device 500. Further, that the time interval of the discharging notification signal inputted to the processing device 600 from the supplying device of the previous stage is shortened means that the supply amount of the processing objects X to the processing device 600 is increased, so that the processing device 600 may determine that the insufficient supply of the processing objects X is likely to be resolved in its own device on the basis of the time interval of the discharging notification signal outputted from the supplying device of the previous stage. Still further, that the time interval of the discharging notification signal outputted from the processing device 600 is shortened means that the supply amount of the processing objects X to the processing device 600 is increased, so that the bag making and packaging machine 100 may determine that the insufficient supply of the processing objects X is likely to be resolved in the processing device 600 on the basis of the time interval of the discharging notification signal outputted from the processing device 600.

While the invention has been shown and described in detail, the foregoing description is in all aspects illustrative and not restrictive. It is therefore understood that numerous modifications and variations can be devised without departing from the scope of the invention.

The invention claimed is:

1. A packaging system, comprising:
   a processing device performing a predetermined process on supplied processing objects and discharging the processing objects; and
   a packaging machine packaging said processing objects discharged from said processing device, wherein
   said packaging machine includes a control unit centralized controlling the operation of the whole of said packaging machine, and
   said control unit controls said packaging machine to operate in a power-saving mode when insufficient supply of said processing objects is likely to occur in said processing device.

2. The packaging system according to claim 1,
   wherein said control unit recovers said packaging machine from said power-saving mode when insufficient supply of said processing objects is resolved or is likely to be resolved in said processing device.

3. The packaging system according to either one of claims 1 and 2, wherein
   said packaging machine further includes:
   a sealing mechanism sealing packaging material; and
   a heater heating said sealing mechanism, and
   said control unit reduces power consumption of said heater in said power-saving mode.

* * * * *

UNITED STATES PATENT AND TRADEMARK OFFICE
CERTIFICATE OF CORRECTION

PATENT NO. : 8,356,455 B2
APPLICATION NO. : 12/733505
DATED : January 22, 2013
INVENTOR(S) : Ryoichi Sato et al.

It is certified that error appears in the above-identified patent and that said Letters Patent is hereby corrected as shown below:

In the Claims:

Column 16, Lines 58-59, In Claim 3, delete "either one of claims 1 and 2," and insert -- claim 1, --, therefor.

Signed and Sealed this
Thirtieth Day of April, 2013

Teresa Stanek Rea
*Acting Director of the United States Patent and Trademark Office*